Nov. 22, 1966  C. F. WOLFENDALE  3,287,716
CAPACITIVE POTENTIOMETER REBALANCING SYSTEM
Filed Sept. 26, 1961  3 Sheets-Sheet 1

INVENTOR
CALEB FREDERICK WOLFENDALE
BY Hane and Nydick
ATTORNEYS

INVENTOR
CALEB FREDERICK WOLFENDALE
BY Hane and Wydick
ATTORNEYS

United States Patent Office 3,287,716
Patented Nov. 22, 1966

3,287,716
CAPACITIVE POTENTIOMETER REBALANCING SYSTEM
Caleb Frederick Wolfendale, London, England, assignor, by mesne assignments, to Sogenique (Electronics) Limited, Newport, Pagnell, Buckinghamshire, England, a British limited company
Filed Sept. 26, 1961, Ser. No. 140,874
Claims priority, application Great Britain, Sept. 27, 1960, 33,144/60
4 Claims. (Cl. 340—187)

This invention relates to electric position-determining and position-control apparatus. More specifically, the invention relates to such apparatus employing a position-sensitive means comprising two relatively movable members, one of which is part of a capacitative potentiometer, and the other a cooperating electrode. An apparatus of this kind is described in applicant's prior Patent No. 3,071,758 issued January 1, 1963.

One form of apparatus described in this patent comprises a capacitative potentiometer consisting of a line of discrete conductive elements, and a pick-up electrode; the pick-up electrode is insulated from the elements, but is capacitatively coupled thereto. Means are provided whereby relative movement can occur between the pick-up electrode and the line of elements, and as this relative movement occurs, the pick-up electrode assumes a potential the value of which is related to the potentials on the adjacent elements. The present invention concerns improvements in apparatus of this general kind.

The invention consists broadly of a position responsive apparatus comprising a potentiometric device including a series of elements adapted to be energized from a potential source to establish a spatial field distribution, a pick-off means mounted for movement relative to said elements for deriving from said field a potential which is a function of the relative position of said means and said elements, reference means adapted to be energized from said source for establishing a point of reference potential, position indicating or control means responding to a signal derived from the difference in potential between said point of reference potential and said pick-off means, and means for modifying the effective variation of said signal for a given relative movement of said elements and said pick-off means.

Other features and advantages of the invention will appear from the following description of embodiments thereof, given by way of example, in conjunction with the accompanying drawings, in which FIGURES 1 to 10 are simplified circuit diagrams of apparatus in accordance with the invention.

Figure 1:
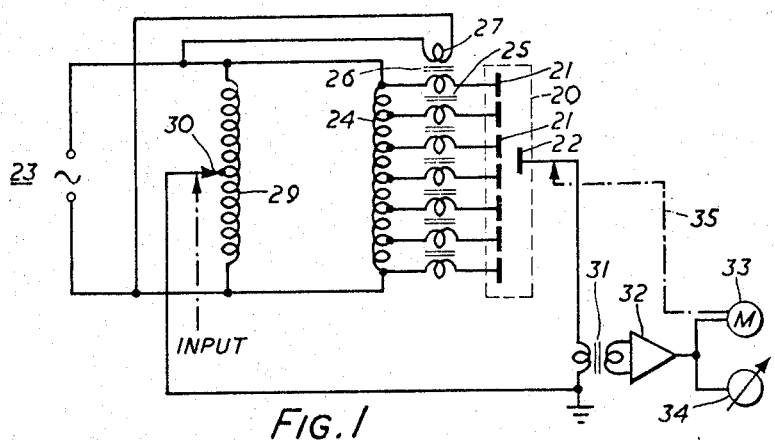

One form of the invention is shown in FIGURE 1, and is an apparatus which can be used to move an element to a predetermined position. In FIGURE 1, a capacitative potentiometer, the parts of which are enclosed within the dotted rectangle 20, comprises a series of conductive elements 21 and a relatively movable element 22; in the present case the elements 21 are stationary, the electrode 22 being movable. Electrical potentials which are applied to the elements are derived from an alternating current source 23, across which is connected also a first inductive device 24. The device 24 has on it a number of taps connected respectively to the elements 21, these connections each including one of the six secondary windings 25 of a transformer 26, whose primary winding 27 is fed also from source 23.

As a result of this arrangement, relative potentials on the elements 21 will be determined by the vector sum of the voltages at the taps on device 24 and the voltages appearing on the individual secondary windings 25. By appropriate selection of the taps and the magnitude of the voltages on the secondary windings, the nature of the potential gradient along the length of the series of elements 21 can be selected or adjusted to follow a wide range of characteristics. Thus, the gradient can be made to follow more closely a linear, or non-linear, law and correction can be made for imperfections of the potentiometer 20 or the positioning of the taps on device 24.

In the manner described above, as the movable electrode 22 moves along the elements 21 it will assume a potential, with respect to a reference point, of its position relative to the elements of the potentiometer.

It can be arranged that the reference point is so chosen that when the electrode 22 attains a predetermined position with respect to elements 21 the potential of the electrode 22 is that of the reference point; hence, the positioning of the movable electrode can be observed, or controlled, by the difference between the electrode and the reference point, and the electrode can be brought to the predetermined position by moving it until this potential difference is zero.

One means of establishing the reference point is shown in FIGURE 1: a second inductive device 29 is fed from supply 23, and device 29 has a variable tapping point 30 upon it. The potential difference between tap 30 and electrode 22 is applied by transformer 31 to amplifier 32; amplifier 32 can control a reversible motor 34 which will drive electrode 22, as indicated by line 35, in a correcting, null-seeking sense until electrode 22 is in the predetermined position.

In operation, tap 30 is set to a position which corresponds to the desired position of the movable electrode 22. If the electrode is not in the desired position, there will occur between tap 30 and electrode 22 a potential which is a function of that difference; this potential difference can be referred to as an error signal. This error signal will by its magnitude and its phase be characteristic both of the extent and direction of the distance of the movable electrode from the desired position.

Where the apparatus is to be used for indicating the position of a movable element with respect to the setting of the tap 30, an indicator 34 can be used, or motor 33 can be made to vary the position of the tap 30 on the potentiometer 29, until the error signal falls to zero; the position of tap 30 can be shown on any suitable indicating device.

Figure 2:
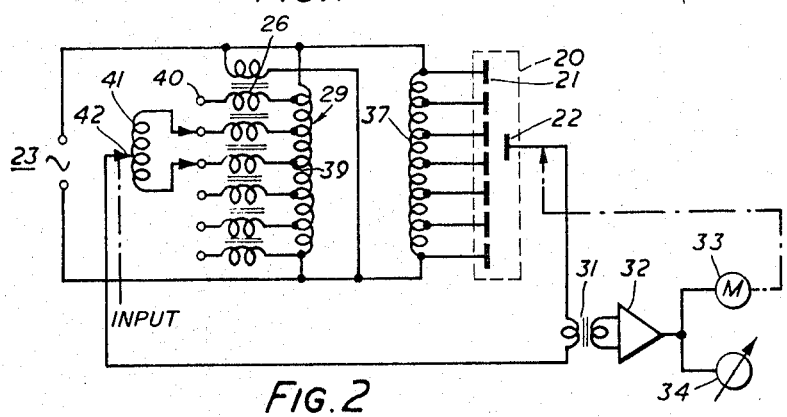

In FIGURE 1, modification of response of the apparatus is effected by transformer 26 associated with the potentiometer 20, but modification can also be effected by a similar transformer associated with the inductive device 29; an arrangement of this kind is shown in FIGURE 2. As shown in FIGURE 2, the capacitative potentiometer elements 21 are connected directly to the respective taps on device 24; the device is provided with a plurality of taps 37 and each is connected directly to an element 21. The inductive device 29 also has taps, at 39 and these taps are connected through secondary windings 25 of transformer 26 to a series of selecter switch studs 40. A further inductive element 41 can be connected to any two adjacent studs 40. The reference point is selected by choice of the studs 40 to which element 41 is connected, and by a variable tap 42 on element 41. The former gives a coarse control and the latter a fine one.

Figure 3:
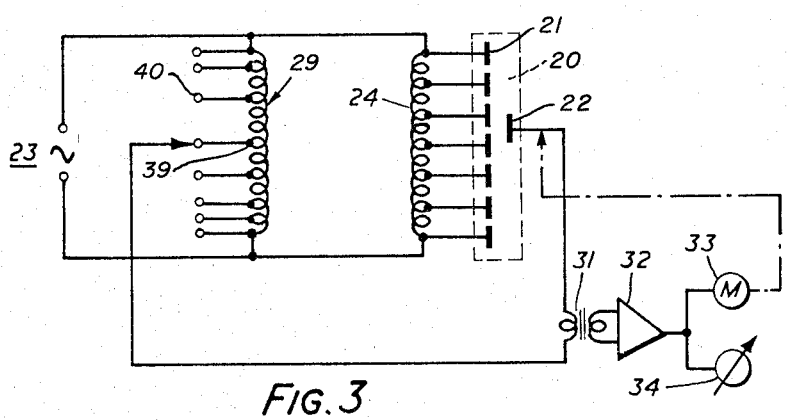
Figure 4:
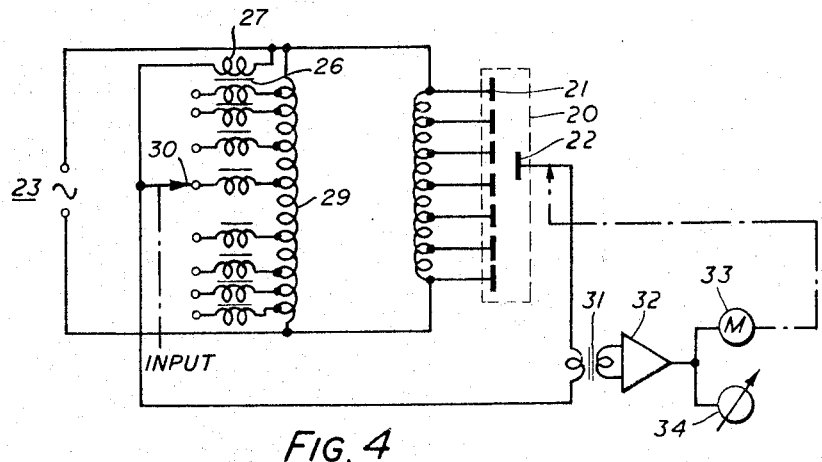

FIGURES 3 and 4 are arrangements in which the law of response of the apparatus follows a law that differs from linearity, and which may approximate a desired law. The taps 39 are spaced at predetermined, inequal intervals, which will give a response law consisting of a series of straight line approximations to a curve. The arrangement of FIGURE 4 shows the use of a transformer 26 for modifying the voltages appearing at studs 40. An inductive element such as 41 of FIG. 2 can be used with the arrangements of FIGURES 3 and 4. FIGURE 4 is an example of another means by which the law of response can be changed; this consists in varying the voltage applied to the primary winding 27 of transformer 26. Thus, this voltage can be less than the voltage of source 23, by connecting the winding across part only of the inductive device 29 and, as with the arrangement shown in FIGURE 4, the voltage may be adjusted with different settings of the tap 30. In FIGURE 4, this is achieved by connecting the primary winding of the transformer between a point on the element 29 and tap 30.

Figure 5:
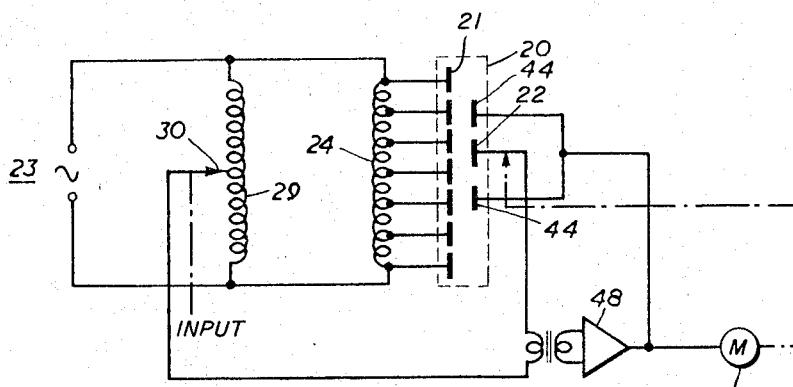

Guard rings or electrodes can be used with electrode 22, and FIGURE 5 is an example, where the guard electrodes are shown at 44 the guard electrodes are connected together and to the output of an amplifier 48 of unity gain. Amplifier 48 may form part of amplifier 32. By this means the potential of the guard electrodes can be brought substantially to that of electrode 22. FIGURE 5 is otherwise as FIGURE 1, omitting transformer 26. Alternatively, the guard rings can be adjusted in potential with respect to the pick-up electrode 22, or to the elements 21, to give some desired effect; for example, the effective gap between the guard rings and the pick-up electrode can be varied in relation to the voltages on these elements.

Figure 6:
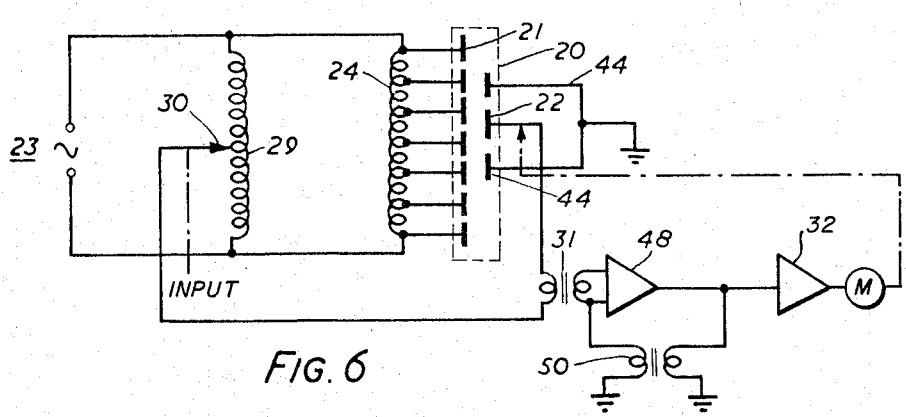

In the arrangement shown in FIGURE 6, guard electrodes 44 are used also. These electrodes are maintained at earth potential and means are provided also whereby in operation the pick-up electrode 22 is also maintained at or near earth potential. For this purpose, included in series with the primary winding of transformer 31 and earth is the secondary winding of a further transformer 50, the secondary winding of which is fed from the output of amplifier 48. By suitable design of the transformers 31 and 50, in relation to the amplifier 48, it can thus be arranged that electrode 22 is at or near earth potential, without being connected to earth. The effect of the stray capacitance of the electrode, represented by $C_s$, is thus reduced. It will be seen that the addition of this feed-back loop does not reduce the sensitivity of the bridge arrangement shown in FIGURE 6, because of the winding of the transformer 50 is not effectively in series with the primary winding of the transformer 31. Both the arrangements shown in FIGURES 5 and 6 have the advantage of good sensitivity.

Figure 7:
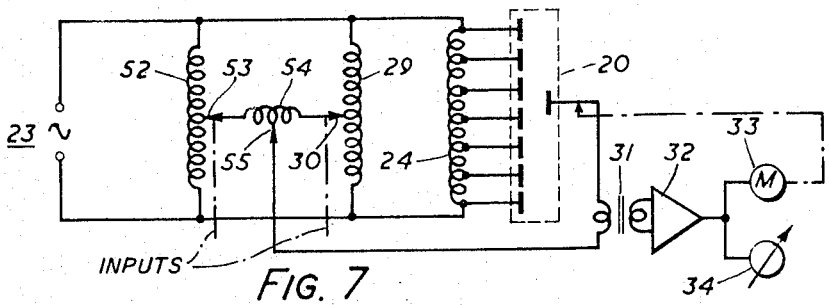

In the arrangement of FIGURE 7 is shown another means for adjusting the reference point. In FIGURE 7, the inductive element 29 is supplemented by a further such element 52, with a variable tap 53. A transformer, indicated as an auto-transformer consisting of an inductor 54 tapped at 55, is connected between taps 53 and 30; the tap 55 establishes the reference potential.

The voltage at the reference point will depend upon the settings of both the variable taps 53 and 30, but the relative effects of the two adjustments will depend upon the ratio of auto-transformer 54. The ratio may or may not be unity.

Figure 8:
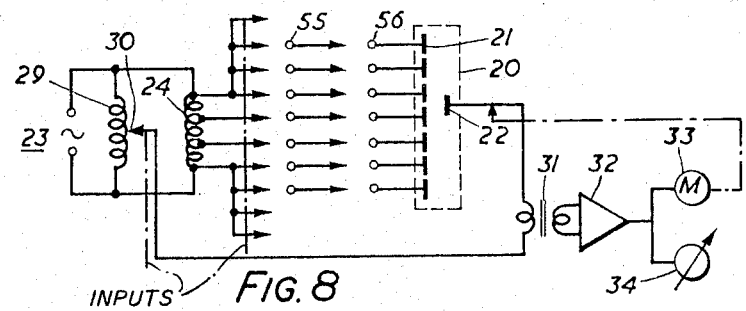

FIGURE 8 shows an arrangement by which zero offset can be obtained. As shown, the number of elements in the capacitative potentiometer is greater than the number of taps on the inductive device 24 from which potentials are impressed on the elements. Two switches 55 and 56 are used to select which of the elements have a difference of potential impressed upon them, and the extent of the offset. The outermost contacts of switch 55, at each end, are connected together, so as to form as many separate contact groups as there are taps on device 24.

The contacts of switch 56 are connected to the potentiometer elements. The arrangements of FIGURES 7 and 8 both enable the reference potential to be changed by a plurality of external setting controls. Other switching arrangements of this kind can be used to modify the distribution of potential on elements 21, as to the number of elements energized, the value of the impressed potential and its phase in relation to the reference potential.

Figure 9:
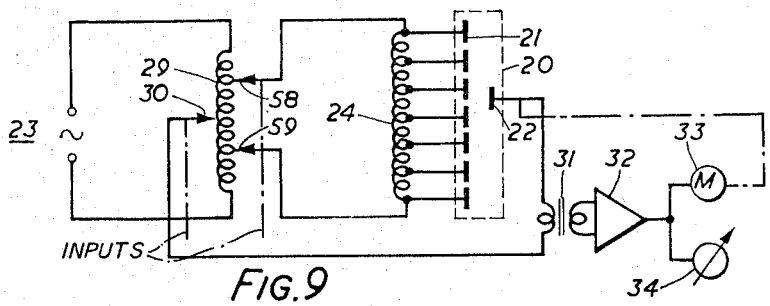

FIGURE 9 shows an arrangement in which the reference potentials are adjustable in such a way as to provide an offset which is equivalent to alteration of scale, and to give zero-setting. In this case, the voltages applied to the elements of the capacitative potentiometer 20 are derived from tappings on the inductive device 24 but the ends of device 29 are connected to two adjustable taps 58, 59 on the inductive element 29. Hence it will be seen that by adjusting the relative position of these taps, the magnitude of the voltage across the device 24 can be varied, and in consequence the magnitudes of the respective voltages on the elements of the potentiometer. In addition, a step-up effect could be obtained, reversing the arrangement and connecting the element 29 to two taps on the device 24.

Figure 10:
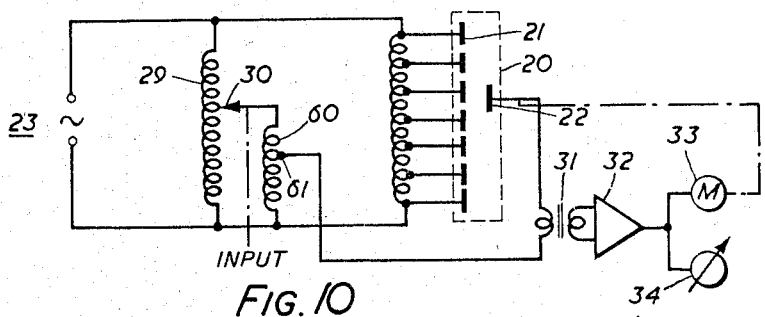

In FIGURE 10, a similar scaling effect is obtained by the use of an additional auto-transformer 60, which is connected across an adjustable portion of the inductive device 29. The tap 61 on the auto-transformer then establishes the reference voltage. It will be understood that these methods of scaling can be combined, for example by means of switches, to afford different scale ranges, sensitivities, offsets, or the like, as desired.

It is also possible for the other modifications described to be combined as appropriate. As an example, the correcting or modifying transformer 26 can be used in other than the arrangements in which it is shown in the drawings.

It will be appreciated also that the number of elements of the capacitative potentiometer, taps on devices 24, 29 or 39 and contacts on switches 55 and 56 can be different, either greater or less, from the numbers shown. Also, it may be convenient in some cases to combine elements such as 24 and 30 in a common inductive device. Again, two or more elements such as 20 can be combined, with the same or different effective scales, to operate from a common element such as 30.

I claim:

1. A position responsive device comprising a source of alternating current, a first inductor connected to said source of alternating current, said first inductor including a plurality of linearly displaced first taps, a plurality of fixed conductive elements, each of said elements being connected to one of said first taps, a first movable conductive element, said first movable conductive element having electrostatic coupling with said fixed conductive elements, a second inductor, said second inductor including a plurality of linearly displaced second taps, a plurality of electrical contacts, a transformer including a primary winding and a plurality of secondary windings, said primary winding being connected to said source of alternating current, each of said secondary windings respectively connecting one of said second taps to one of said electrical contacts, a second movable conductive element positionable to contact at least one of said electrical contacts, a signal difference generating means including first and second input terminals and an output for generating a signal related to the difference in the signals received at said input terminals, means for electrically connecting said first movable conductive element and said second movable conductive element to said input terminals and motor means including a signal input connected to the output of said signal difference generating means and a mechanical output for generating a mechanical movement in accordance with the signal received at said signal input.

2. The position responsive device of claim 1 wherein said motor means drives an indicator whereby the position of one of said movable conductive elements is indicated.

3. The position responsive device of claim 1 further comprising means mechanically connecting the mechanical output of said motor means to said first movable conductive element for driving the latter past said fixed conductive elements.

4. The position responsive device of claim 1 wherein said second movable conductive element comprises a further inductor selectively connectible across two of said electrical contacts and a movable electrical contact positionable to electrically contact selected points along said further inductor.

References Cited by the Examiner

UNITED STATES PATENTS

| | | | |
|---|---|---|---|
| 2,462,599 | 2/1949 | Blumlein et al. | 323—75 |
| 2,762,016 | 9/1956 | Montani | 340—364 |
| 2,889,504 | 6/1959 | Spencer | 323—43.5 X |
| 2,980,836 | 4/1961 | Hathaway | 340—187 |
| 3,004,200 | 10/1961 | Phillips | 340—187 |
| 3,032,702 | 5/1962 | Scott et al. | 323—54 X |
| 3,071,758 | 1/1963 | Wolfendale | 340—187 |

NEIL C. READ, *Primary Examiner.*

LLOYD McCOLLUM, THOMAS HABECKER,
*Examiners.*

J. M. THOMSON, *Assistant Examiner.*